US012681152B2

(12) United States Patent
Qi et al.

(10) Patent No.: US 12,681,152 B2
(45) Date of Patent: Jul. 14, 2026

(54) DUAL-POLARIZED LIGHT DETECTION AND RANGING RECEIVING END BASED ON OPTICAL CHIP

(71) Applicant: SiFotonics Technologies (Beijing) Co., Ltd., Beijing (CN)

(72) Inventors: Fan Qi, Beijing (CN); Pengfei Cai, Beijing (CN)

(73) Assignee: SiFotonics Technologies (Beijing) Co., Ltd., Beijing (CN)

( * ) Notice: Subject to any disclaimer, the term of this patent is extended or adjusted under 35 U.S.C. 154(b) by 919 days.

(21) Appl. No.: 17/983,185

(22) Filed: Nov. 8, 2022

(65) Prior Publication Data

US 2024/0151831 A1 May 9, 2024

(51) Int. Cl.
*G01C 3/08* (2006.01)
*G01S 7/481* (2006.01)
*G01S 7/4912* (2020.01)

(52) U.S. Cl.
CPC .......... *G01S 7/4912* (2013.01); *G01S 7/4816* (2013.01)

(58) Field of Classification Search
CPC .............................. G01S 7/4912; G01S 7/4816
See application file for complete search history.

(56) References Cited

U.S. PATENT DOCUMENTS

| | | | | |
|---|---|---|---|---|
| 11,619,783 B2 * | 4/2023 | Yao | .................... | G02B 6/29353 385/27 |
| 2022/0334227 A1 * | 10/2022 | Davydenko | ........... | G01S 7/4817 |

FOREIGN PATENT DOCUMENTS

| | | | | | |
|---|---|---|---|---|---|
| CN | 114063045 A | * | 2/2022 | ........... | G01S 7/4914 |
| CN | 115128734 A | * | 9/2022 | ............... | G02B 6/12 |

\* cited by examiner

*Primary Examiner* — Mark Hellner

(57) ABSTRACT

The present invention provides a dual-polarized Lidar receiving end based on an optical chip, including a module for receiving reflected light, a module for receiving local oscillator light, a plurality of frequency mixers, a plurality of detectors and a plurality of variable optical attenuators. The Lidar receiving end according to the present invention can receive and process two optical signals in an orthogonal polarization state. Compared with the existing Lidar design solution, a system on chip based on the optical chip according to the present invention implements monolithic integration of massive devices, and has the advantages of high stability, small volume and low weight and costs, and the like. It is relatively easy to increase a quantity of channels at the receiving end designed according to the present invention. When the quantity of the channels is increased, an optical aperture of a receiving port also increases accordingly, so that an effective angular field of the receiving end also increases accordingly so as to extend an angle range in which the Lidar can operate.

12 Claims, 9 Drawing Sheets

DUAL-POLARIZED LIGHT DETECTION AND RANGING RECEIVING END BASED ON OPTICAL CHIP

TECHNICAL FIELD

The present invention relates to the field of optoelectronic technologies, and in particular, to a dual-polarized light detection and ranging, or laser imaging, detection and ranging (Lidar) receiving end based on an optical chip.

BACKGROUND

There are various forms of frequency modulated continuous wave (FMCW) Lidar receiving ends based on an optical chip, for example, a receiving end based on an OPA antenna combined with a frequency mixer and a detector, and a receiving end based on a discrete grating coupler combined with a frequency mixer and a detector, where an OPA refers to an optical phased array, which may emit and scan light beams, and also receive light beams. Previous designs have taken into account only one polarization state. However in a coherent light communication application, it is required to receive and process signal light in two polarization states, but a chip at a receiving end thereof is structurally different from that in a Lidar application, and thus cannot be used directly.

Generally, Lidar emits the light beams, and then receives the returned optical signals. In a real scenario, most of the emitted light beams are linearly polarized light, but the returned light's polarization state is generally no longer linearly polarized light. Generally, the Lidar based on the optical chip only receives or only processes the signal light in one polarization state, thus not only losing partial energy, but also missing surface reflection information of a detected object, especially reflection information related to the polarization. On the other hand, the emitted light may also be specially adjusted to be in a circular polarization state or another polarization state, so as to detect reflection characteristics of the object. In this case, it is necessary to receive and process the light in the two polarization states, but the existing Lidar receiving end cannot process the light in the two polarization states.

SUMMARY

To solve the foregoing technical problem, the present invention provides a dual-polarized Lidar receiving end based on an optical chip. The following provides a brief overview to gain a basic understanding of some aspects of the disclosed embodiments. The overview is not a general review, and is not intended to determine key/important components or describe the protection scope of these embodiments. The only objective thereof is to present some concepts in a simple form as a preface to the detailed explanations that follow.

The present invention employs the following technical solution:

Provided is a dual-polarized Lidar receiving end based on an optical chip, including: a module for receiving reflected light, configured to receive various paths of signal light returned and split each path of signal light received into two paths of light according to its polarization state, wherein the two paths of light obtained from the each path of signal light are TE-polarized;

a module for receiving local oscillator light, configured to introduce local oscillator light into the receiving end and split the same into a plurality of beams;

a plurality of frequency mixers, configured to mix the TE-polarized local oscillator light output by the module for receiving local oscillator light and all light beams obtained from the module for receiving reflected light, and output two paths of frequency-mixing light beams; and a plurality of detectors, configured to receive frequency-mixing light beams output by the frequency mixers and convert the frequency-mixing light beams into current signals.

Further, the module for receiving reflected light is composed of a plurality of signal light receiving channels, and each of the signal light receiving channels receives one path of signal light; each of the signal light receiving channels includes a first coupler and a polarized rotating beam splitter connected to the first coupler, where the first coupler couples the returned signal light to an optical waveguide, and each of the polarized rotating beam splitters splits and rotates two paths of signal light which are orthogonal in polarization directions, and finally outputs two paths of TE-polarized light.

Further, the module for receiving reflected light is composed of a plurality of dual-polarized coupled beam splitters which are arranged in an array, and each of the dual-polarized coupled beam splitters receives one path of signal light; and each of the dual-polarized coupled beam splitters splits and rotates the two paths of signal light which are orthogonal in polarization directions, and finally outputs two paths of TE-polarized light.

Further, the dual-polarized Lidar receiving end based on the optical chip further includes a plurality of variable optical attenuators, where all light beams obtained from the module for receiving reflected light enter the variable optical attenuators and then enter the frequency mixers.

Further, the module for receiving local oscillator light includes a second coupler and a local oscillator light processor; the linearly polarized light enters a waveguide through the second coupler and is TE-polarized in the waveguide, and then is introduced into the local oscillator light processor through the waveguide; and the light output by the local oscillator light processor is introduced into the frequency mixers through the waveguide.

Further, the local oscillator light processor is a waveguide.

Further, the local oscillator light processor is a 1×N beam splitter, and the 1×N beam splitter is formed by the cascading of 1×2 beam splitters.

Further, the local oscillator light processor is a 1×N router, and the 1×N router is formed by the cascading of 1×2 routers and/or 2×2 routers; each of the 1×2 routers is composed of 1×2 beam splitters, 2×2 beam splitters and a phase shifter; and each of the 2×2 routers is composed of the 2×2 beam splitters and a phase shifter.

The present invention has the following beneficial effects: The Lidar receiving end according to the present invention can receive and process two optical signals in an orthogonal polarization state. Compared with the existing Lidar design solution, a system on chip based on the optical chip according to the present invention implements monolithic integration of massive devices, and has the advantages of high stability, small volume and low weight and costs, and the like. It is relatively easy to increase a quantity of channels at the receiving end designed according to the present invention. When the quantity of the channels is increased, an optical aperture of a receiving port also increases accordingly, so that an effective angular field of the receiving end also increases accordingly so as to extend an angle range in which the radar can operate.

DETAILED DESCRIPTION OF EMBODIMENTS

Figure 1:
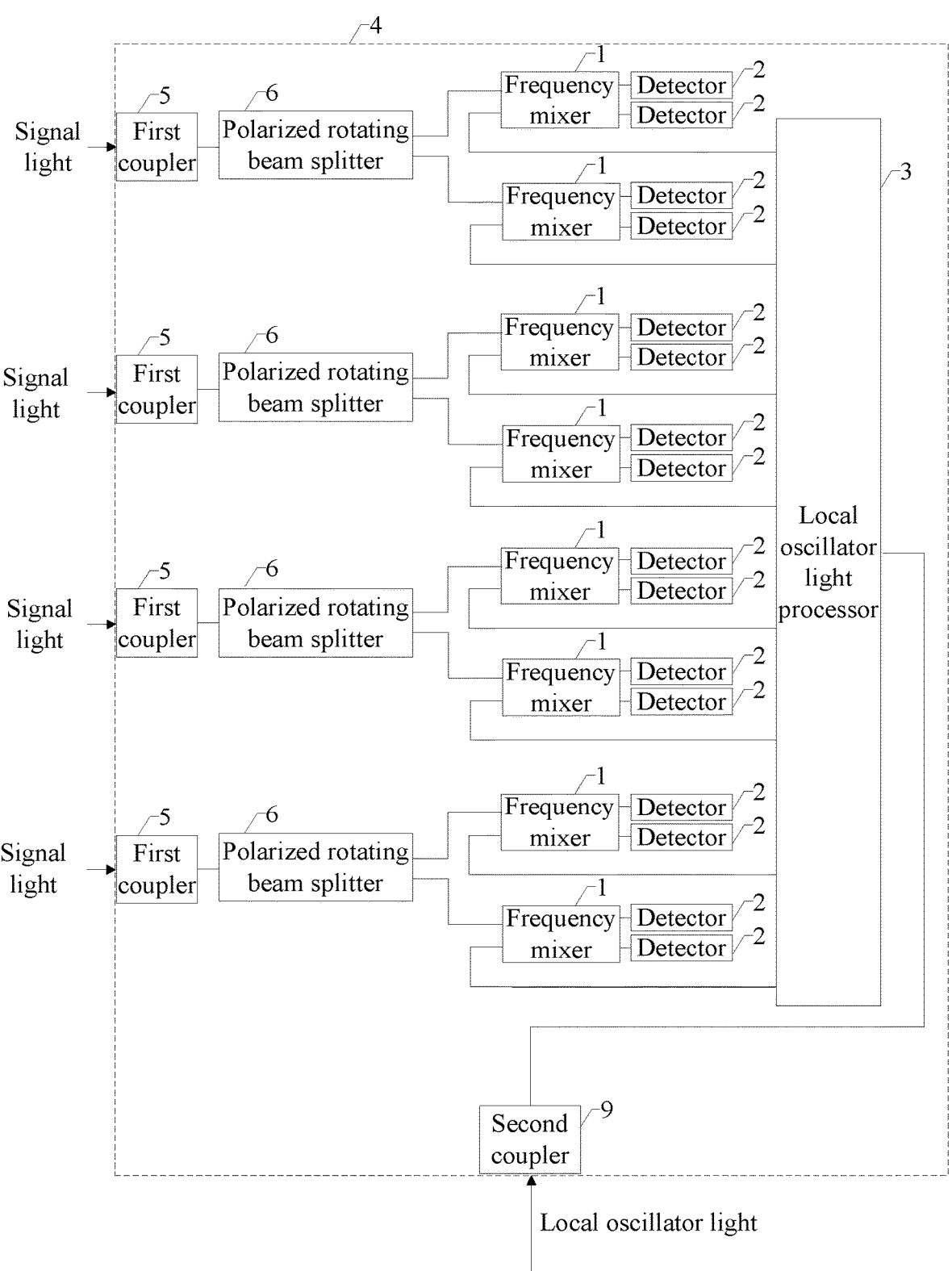
FIG. 1 is a schematic structural diagram of a one-dimensional Lidar receiving end according to the present invention.

The following description and accompanying drawings fully present specific implementation solutions of the present invention, so that a person skilled in the art can practice them. Other implementation solutions may include structural, logic, electrical, procedural and other variations. Embodiments merely typify possible variations. Unless expressly required, separate components and functions are optional, and the order of operation may be varied. Portions and features of some implementation solutions may be included in, or replaced with, those of other implementation solutions.

Generally, local oscillator light is linearly polarized, and TE-polarized after being input into an optical chip, and thus signal light received by a Lidar receiving end is also required to be TE-polarized, so as to cause interference in the frequency mixers. Therefore, the dual-polarized Lidar receiving end according to the present invention needs to receive the light in two polarization states, the light in one polarization state remains unchanged and is coupled into the optical chip to be TE-polarized, and the light in the other polarization state is also TE-polarized after rotating 90° on the optical chip.

As shown in FIG. 1 to FIG. 10, in some illustrative embodiments, provided is a dual-polarized Lidar receiving end based on an optical chip, including a module for receiving reflected light, a plurality of frequency mixers 1, a plurality of detectors 2 and a module for receiving local oscillator light.

The module for receiving reflected light is composed of a plurality of signal light receiving channels, or a plurality of dual-polarized coupled beam splitters which are arranged in an array. The Lidar receives returned optical signals after emitting light beams; and the module for receiving reflected light according to the present invention is configured to receive various paths of signal light returned and split each path of signal light received into two paths of light according to the polarization state, and the two paths of light finally obtained from each path of signal light are TE-polarized. The module for receiving local oscillator light includes a second coupler 9 and a local oscillator light processor 3. The linearly polarized light enters a waveguide through the second coupler 9 and is TE-polarized in the waveguide, and then is introduced into the local oscillator light processor 3 through the waveguide; and the light output by the local oscillator light processor 3 is introduced into the frequency mixers 1 through the waveguide.

The local oscillator light processor 3 is a waveguide, or a 1×N beam splitter or a 1×N router, where a specific value of N corresponds to a specific quantity of the frequency mixers 1. The module for receiving local oscillator light is configured to introduce local oscillator light into the receiving end and split the local oscillator light into a plurality of beams, that is, the module for receiving local oscillator light is configured to introduce the local oscillator light into the optical chip 4 to be TE-polarized, further split the TE-polarized light into N beams, and then introduce the TE-polarized light into the frequency mixers 1.

A beam splitter refers to that N ports output the light simultaneously. Generally, light intensities of the N ports are equal, or may be unequal certainly. The router refers to that only one of the N ports outputs light at a time, but other ports do not output light. In actual cases, the port, which does not output the light theoretically, of the router will output a small amount of light, but the intensity of the light is far less than that of the port which outputs the light theoretically.

The frequency mixers 1 are configured to mix the TE-polarized local oscillator light output by the module for receiving local oscillator light and all light beams obtained from the module for receiving reflected light, and output two paths of frequency-mixing light beams.

The detectors 2 are configured to receive the frequency-mixing light beams output by the frequency mixers 1 and convert the frequency-mixing light beams into current signals.

As shown in FIG. 1, a one-dimensional Lidar receiving end is provided. In FIG. 1, black solid lines express optical waveguides. The following illustrates four paths of signal light as an example therein. In some illustrative embodiments, the module for receiving reflected light according to the present invention is composed of a plurality of signal light receiving channels, each of which receives one path of signal light. Each of the signal light receiving channels includes a first coupler 5 and a polarized rotating beam splitter 6 connected to the first coupler 5, where the first coupler 5 couples the returned signal light into an optical waveguide, and each of the polarized rotating beam splitters 6 splits and rotates two paths of signal light which are orthogonal in polarization directions, and finally outputs the two paths of TE-polarized light. Specifically, the four paths of signal light, entering from left ports, are coupled into the optical waveguides by the first couplers 5, and then the two paths of light which are orthogonal in polarization directions are split to upper and lower paths respectively through the polarized rotating beam splitters 6. The present invention has no special requirements for the polarization state of the signal light, so that the signal light may be single-polarized light, circularly polarized light, elliptically polarized light, naturally polarized light, and the like. The two paths of light output by the polarized rotating beam splitter 6 are TE-polarized.

Each of the signal light receiving channels corresponds to two frequency mixers 1. As shown in FIG. 1, each path of signal light is divided into two paths, and there are eight paths in total, which enters 8 frequency mixers 1 respectively. Each of the frequency mixers 1 has two input ports and two output ports, and the signal light obtained from the corresponding polarized rotating beam splitter 6 is input from one of the input ports.

The local oscillator light enters from the lower port, is polarized as the linearly polarized light, and then polarized as TE-polarized light after being coupled into the waveguides, and distributed to each of the frequency mixers 1 through the local oscillator light processor 3, that is, the local oscillator light is introduced and input from another input port of each of the frequency mixers 1. The signal light and the local oscillator light are mixed in the frequency mixers 1, and then jointly output from the two output ports of each of the frequency mixers 1.

One frequency mixer 1 corresponds to two detectors 2, two paths of light beams output from the two output ports of the frequency mixer 1 separately enter one detector 2 which converts an optical signal into a current signal. Generally, a phase difference between the two current signals is 180°, and the two current signals may be subtracted by a circuit outside the optical chip 4 to obtain amplitude-doubled output signals.

The quantity of channels of the dual-polarized one-dimensional Lidar receiving end that receive the signal light may be set to 1 to N on demands. One waveguide directly replaces the beam splitter or the router when the quantity of channels is 1, that is, the module for receiving local oscillator light does not need the beam splitter or the router when the quantity of channels is 1. For the dual-polarized one-dimensional Lidar receiving end, the module for receiving reflected light includes first couplers 5, polarized rotating beam splitters 6 and related waveguides, and is extended in a mode shown in FIG. 7.

On the optical chip, each of the first couplers 5 is generally a reverse-tapered coupler, and one path of light with two orthogonal polarization states may be coupled to the waveguide with relatively high efficiency by virtue of a proper design; each of the polarized rotating beam splitters 6 is also maturely designed and includes an input port and two output ports; TE-polarized part of light is output to one of output ports, and the TM-polarized part of light is output to the other output port and is converted into TE-polarized light; and in addition, the two frequency mixers 1 corresponding to the current polarized rotating beam splitter 6 respectively receive the two paths of light.

Figure 2:
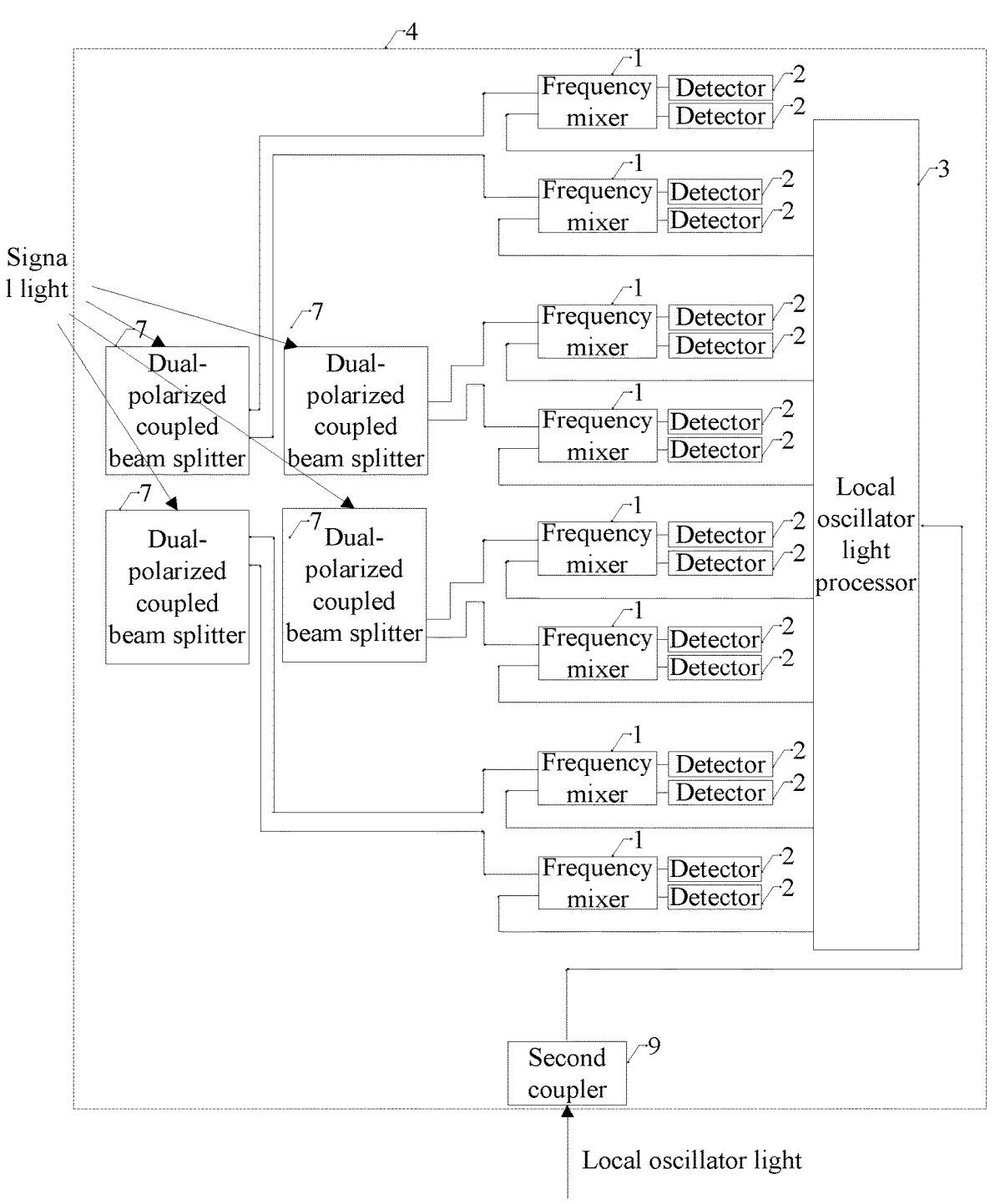
FIG. 2 is a schematic structural diagram of a two-dimensional Lidar receiving end according to the present invention.

As shown in FIG. 2, the two-dimensional Lidar receiving end is provided. Black solid lines express optical waveguides in FIG. 2. The following illustrates four paths of signal light as examples therein. In some illustrative embodiments, the module for receiving reflected light according to the present invention is composed of the dual-polarized coupled beam splitters 7 which are arranged in an array, each of the dual-polarized coupled beam splitters 7 receives one path of signal light, splits and rotates the two paths of signal light which are orthogonal in polarization directions, and finally outputs the two paths of TE-polarized light.

Specifically, the four paths of signal light enter from a 2×2 array composed of the dual-polarized coupled beam splitters 7. Each of the dual-polarized coupled beam splitters 7 may simultaneously couple the two paths of light which are orthogonal in the polarization directions, and respectively output the same to upper and lower paths in a TE-polarized manner. The present invention has no special requirements for the polarization state of the signal light, so that the signal light may be single-polarized light, circularly polarized light, elliptically polarized light, naturally polarized light, and the like. The two paths of light output by the dual-polarized coupled beam splitters 7 are TE-polarized.

The dual-polarized coupled beam splitters 7 are generally two-dimensional grating couplers. The light is incident on a grating from a surface of the chip, and then the light in two polarization states are coupled to the two output waveguides respectively. Each of the dual-polarized coupled beam splitters 7 corresponds to two frequency mixers 1. As shown in FIG. 2, each path of signal light is divided into two paths, and there are eight paths in total, which enters 8 frequency mixers 1 respectively. Each of the frequency mixers 1 has two input ports and two output ports, and the signal light output by the dual-polarized coupled beam splitter 7 is input from one of the input ports.

The local oscillator light enters from the lower port, is polarized as the linearly polarized light, and then polarized as TE-polarized light after being coupled into the waveguides, and distributed to each of the frequency mixers 1 through the local oscillator light processor 3, that is, the local oscillator light is introduced and input from another input port of each of the frequency mixers 1. The signal light and the local oscillator light are mixed in the frequency mixers 1, and then jointly output from the two output ports of each of the frequency mixers 1.

One frequency mixer 1 corresponds to two detectors 2, two paths of light beams output from the two output ports of the frequency mixer 1 separately enter one detector 2 which converts an optical signal into a current signal. Generally, a phase difference between the two current signals is 180°, and the two current signals are subtracted by a circuit outside the optical chip 4 to obtain amplitude-doubled output signals.

Figure 8:
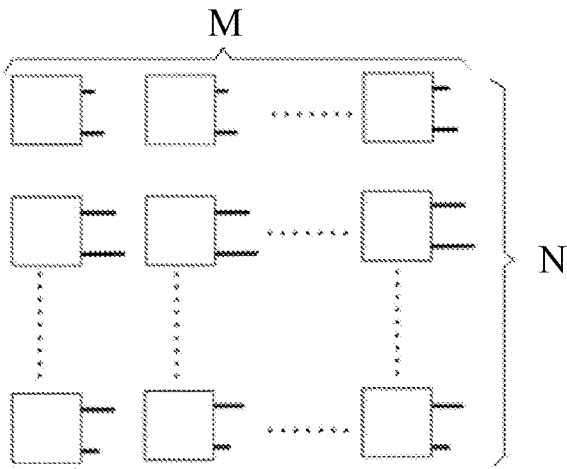
FIG. 8 is a schematic diagram of dual-polarized coupled beam splitters arranged in an M×N array according to the present invention.
Figure 9:
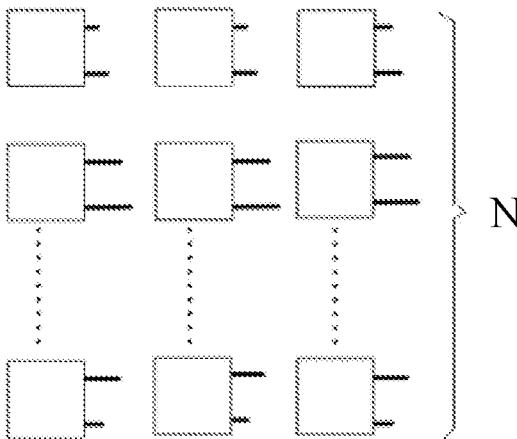
FIG. 9 is a schematic diagram of dual-polarized coupled beam splitters arranged in a 3×N array according to the present invention.

For the dual-polarized two-dimensional Lidar receiving end, a front section only includes the dual-polarized coupled beam splitters 7 and the related waveguides, and is extended in a mode shown in FIG. 8 and FIG. 9, and may be extended to an M×N array, such as 4×4, 8×8 and 3×N. One waveguide directly replaces the beam splitter or the router when the quantity of dual-polarized coupled beam splitters 7 is 1, that is, the local oscillator light processor 3 is a waveguide when the quantity of dual-polarized coupled beam splitters 7 is 1.

Figure 10:
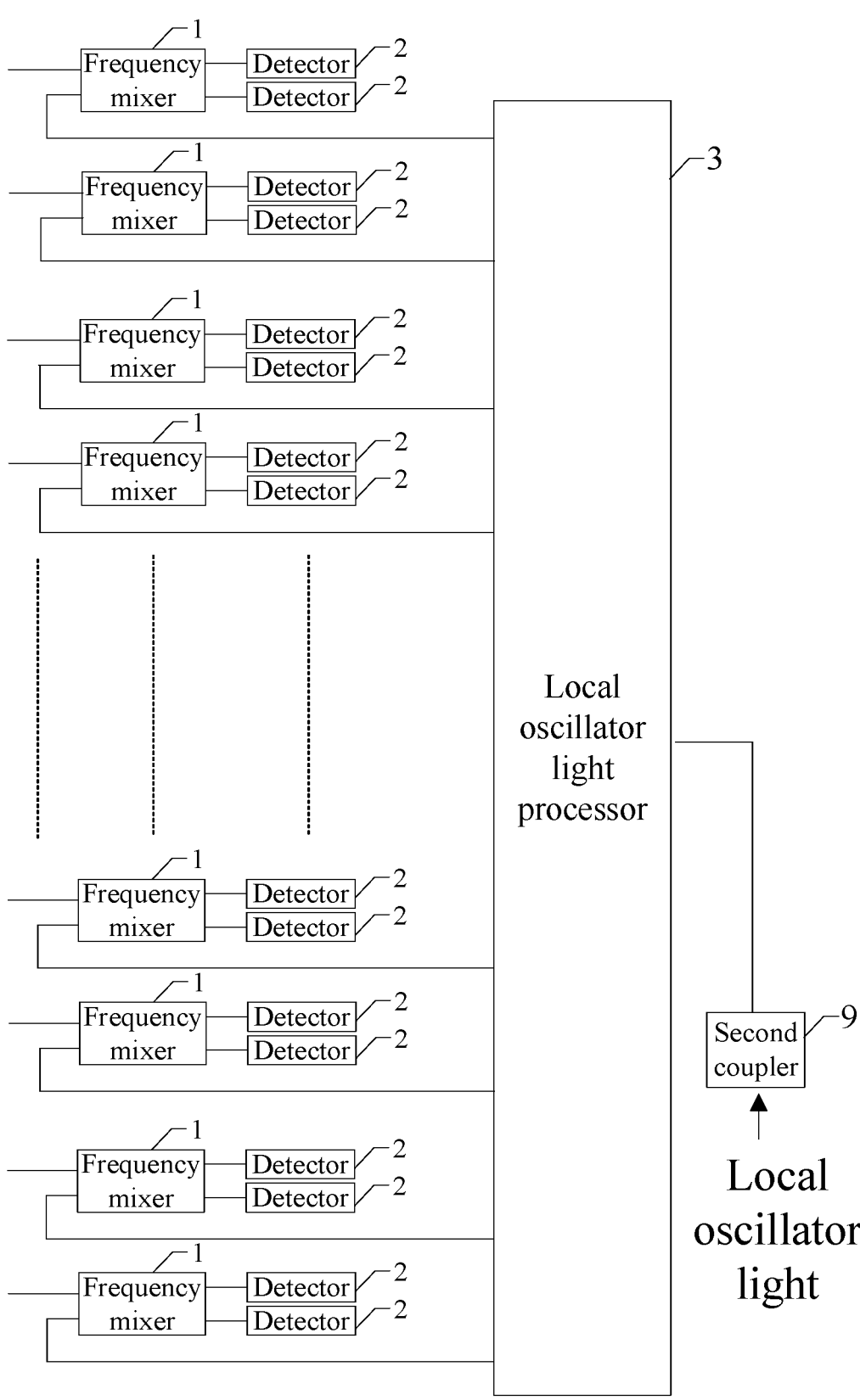
FIG. 10 is a schematic extension diagram of frequency mixers and detectors according to the present invention.

As shown in FIG. 10, rear sections of the one-dimensional Lidar receiving end and the two-dimensional Lidar receiving end are accordingly extended corresponding to the front sections:

A rear section of the one-dimensional Lidar receiving end includes frequency mixers, detectors, beam splitters or routers and related waveguides, and is extended in a mode shown in FIG. 10. When the module for receiving reflected light on the front section is extended to N paths, the local oscillator light processor on the rear section needs to be extended to 2×N paths.

A rear section of the two-dimensional Lidar receiving end includes frequency mixers, the detectors, beam splitters or routers and related waveguides, and is extended in a mode shown in FIG. 10. When the module for receiving reflected light on the front section is extended to an M×N array, the local oscillator light processor on the rear section of the two-dimensional Lidar receiving end needs to be extended to 2×M×N channels.

On the optical chip, the frequency mixers 1 in the one-dimensional Lidar receiving end and the two-dimensional Lidar receiving end have two input ports and two output ports respectively, are generally composed of 50:50 beam splitters, and may be implemented by common designs such as a multi-mode interferometer and a directional coupler. A splitting ratio is generally required to be 50:50, but the splitting ratios of the actually produced beam splitters will deviate from this value. In the present invention, there is no specific requirements for the splitting ratio, and the best splitting ratio is 50:50. Generally, each of the detectors 2 is made into a photodiode (that is, a PD) by virtue of directly extending an absorbing material on the optical chip. In some cases, an avalanche photodetector (that is, an APD) may be integrated on the waveguide. The two detectors have the same function of converting the optical signals into the electrical signals, but the latter has an internal gain, and thus can detect weaker optical signals.

Figure 5:
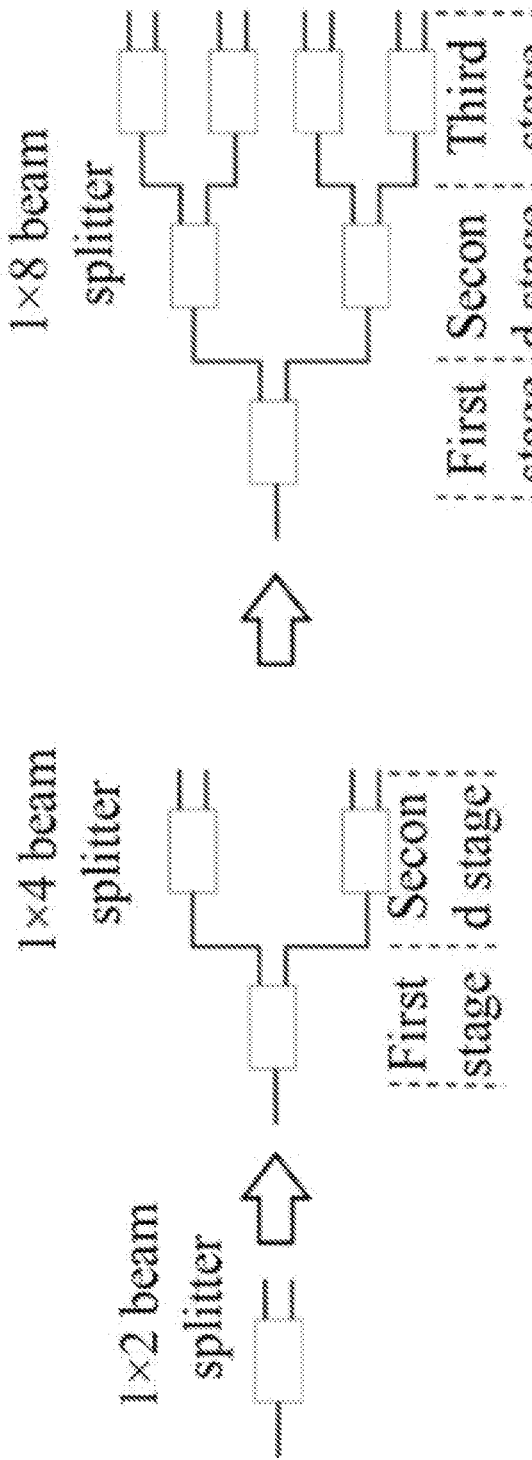
FIG. 5 is a schematic diagram of a constitutive mode of a local oscillator light processor according to the present invention.

As shown in FIG. 5, the local oscillator light processor 3 according to the present invention is a 1×N beam splitter, and the 1×N beam splitter is formed by the cascading of 1×2 beam splitters. Specifically, on the optical chip, each of the 1×2 beam splitters may be constructed based on the common structures, such as a multi-mode interferometer and a Y divider. FIG. 5 illustrates a method for implementing a 1×N beam splitter. A 1×4 beam splitter is formed by means of two-stage cascading, and a 1×8 beam splitter is formed by means of three-stage cascading, and accordingly, a $1 \times 2^m$ beam splitter is formed by means of in-stage cascading.

Figure 6:
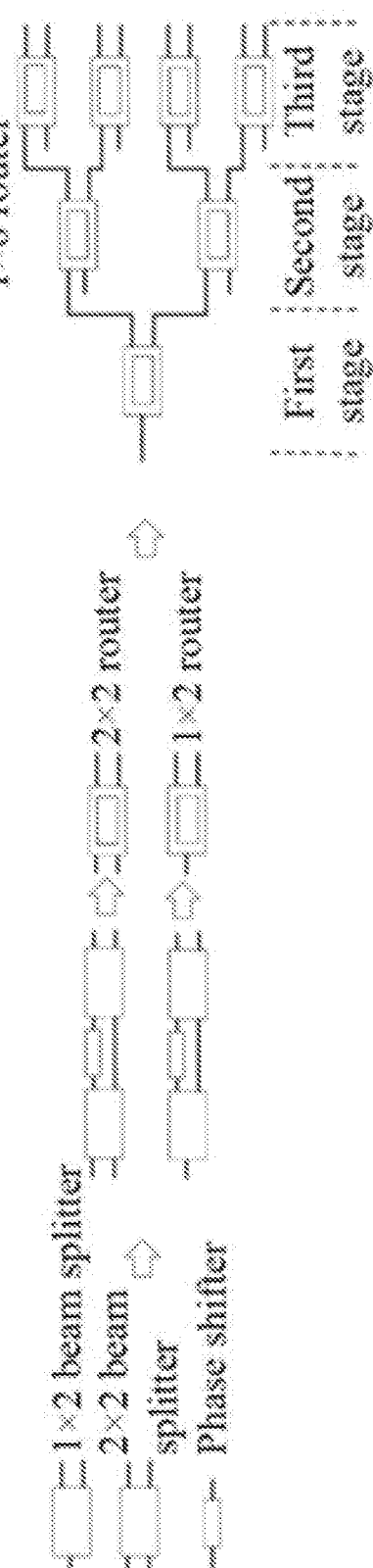
FIG. 6 is a schematic diagram of another constitutive mode of a local oscillator light processor according to the present invention.
Figure 7:
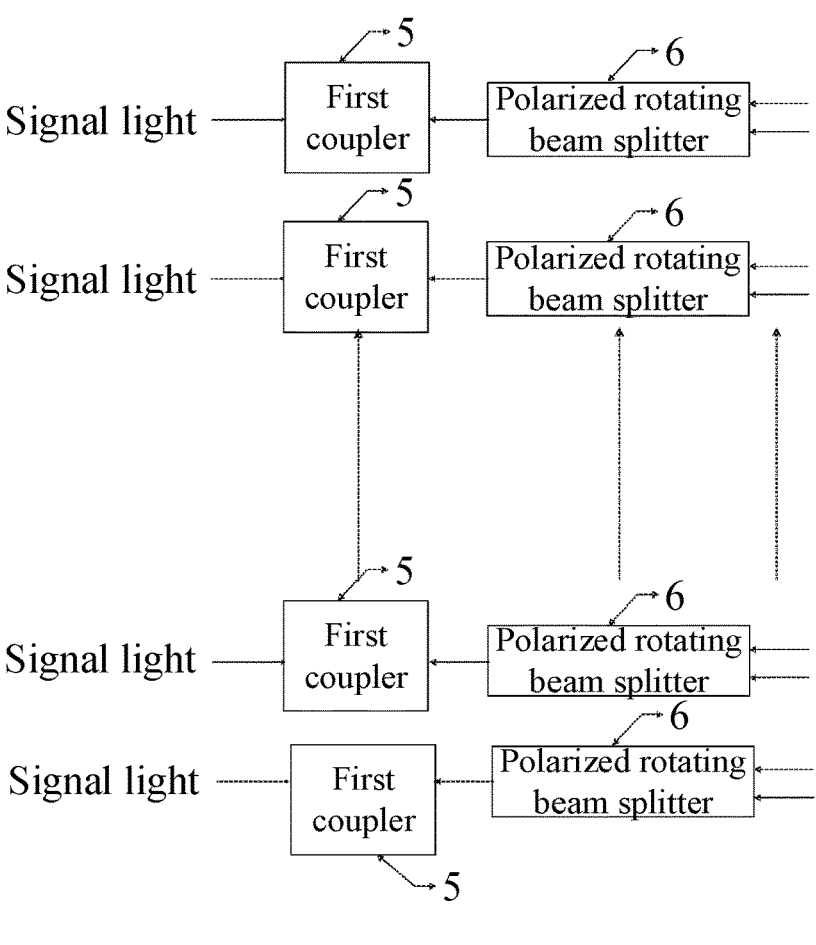
FIG. 7 is a schematic extension diagram of a front section of a signal light receiving channel of a one-dimensional Lidar receiving end according to the present invention.

As shown in FIG. 6, the local oscillator light processor 3 according to the present invention is a 1×N router, and the 1×N router is formed by the cascading of 1×2 routers and/or 2×2 routers; and one of the 1×2 routers and the 2×2 routers may be selected at any stage without special limits. Each of the 1×2 routers is composed of a 1×2 beam splitter, a 2×2 beam splitter and a phase shifter; and each of the 2×2 routers is composed of a 2×2 beam splitter and a phase shifter.

The 1×N router is implemented by forming 1×2 routers or 2×2 optical routers by beam splitters and phase shifters first, and then cascading the 1×2 routers and/or the 2×2 routers. Similarly, a 1×8 or a 2×8 optical router is formed by means of three-stage cascading, a $1 \times 2^m$ router or a $2 \times 2^m$ router is formed by means of in-stage cascading.

Figure 3:
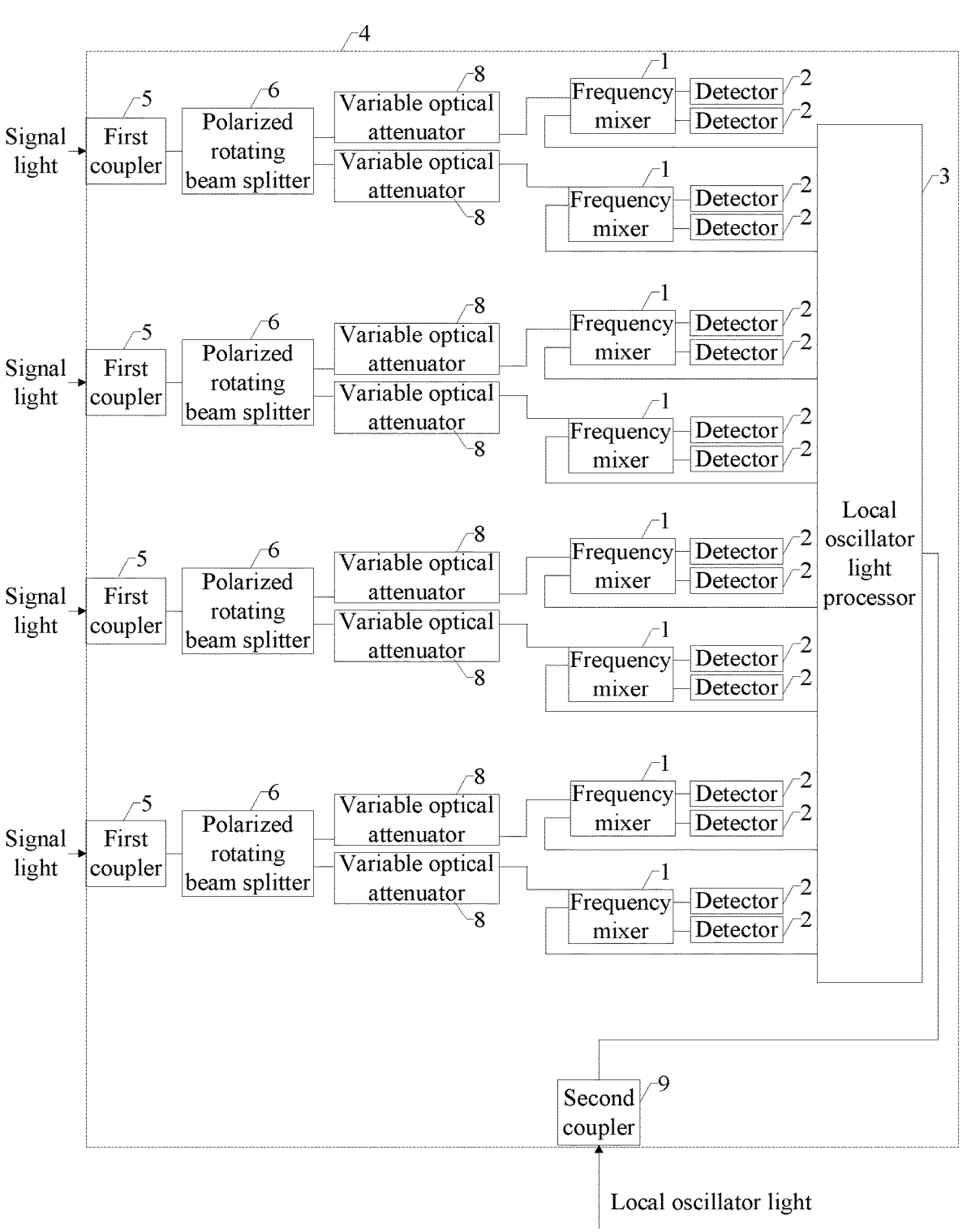
FIG. 3 is a schematic structural diagram of a one-dimensional Lidar receiving end with variable optical attenuators according to the present invention.
Figure 4:
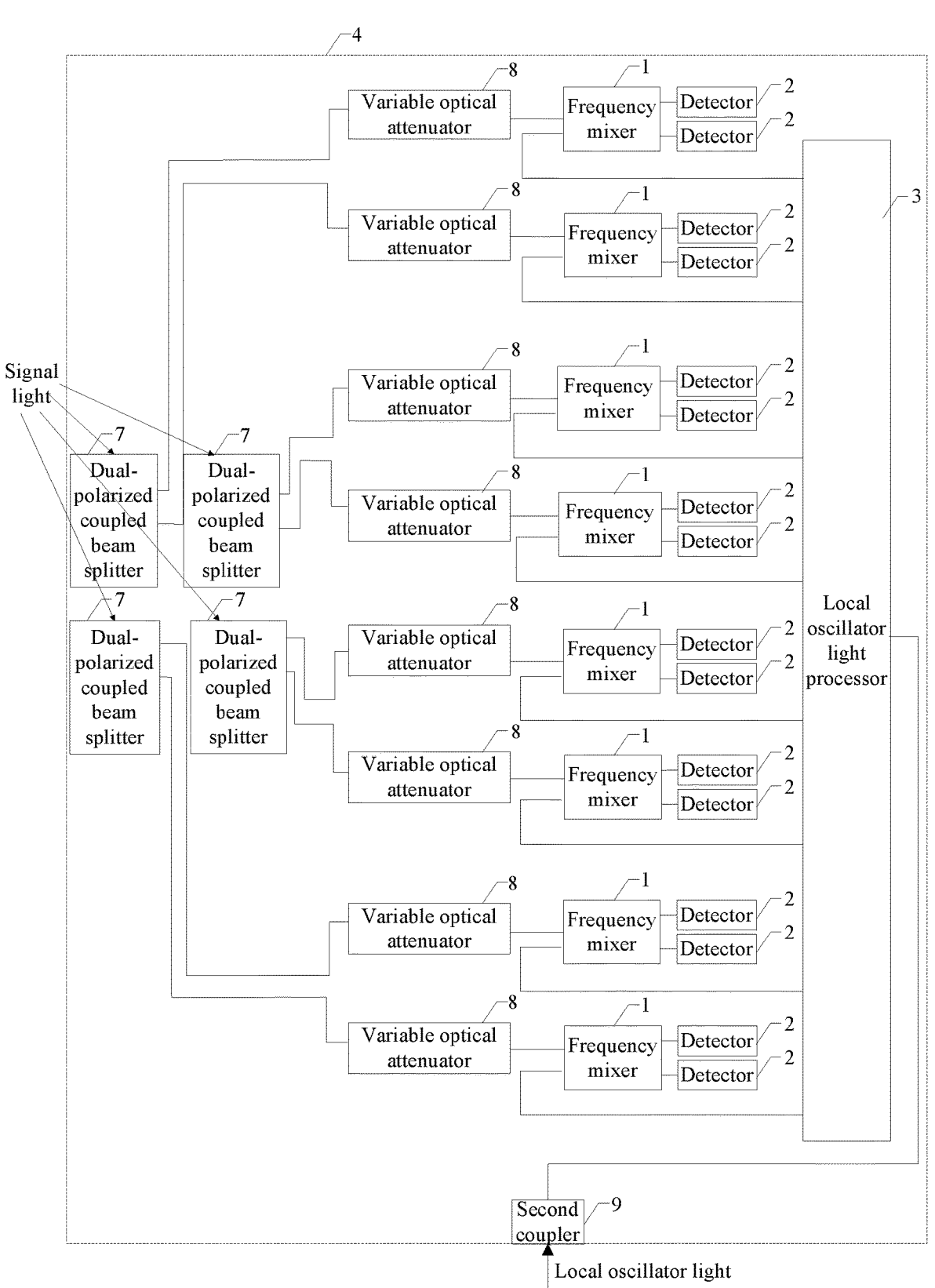
FIG. 4 is a structure diagram of a two-dimensional Lidar receiving end with variable optical attenuators according to the present invention.

As shown in FIG. 3 and FIG. 4, the dual-polarized Lidar receiving end based on an optical chip according to the present invention further includes a plurality of variable optical attenuators 8. Each path of received signal light corresponds to one signal light receiving channel or dual-polarized coupled beam splitter 7, each path of signal light corresponds to two variable optical attenuators 8, each of the variable optical attenuators 8 corresponds to one frequency mixer 1, and each of the frequency mixers 1 corresponds to two detectors 2.

As shown in FIG. 3, all light beams obtained from the polarized rotating beam splitters 6 in the signal light receiving channels enter the variable optical attenuators 8 and then enter the frequency mixers 1. As shown in FIG. 4, all light beams obtained from the dual-polarized coupled beam splitters 7 enter the variable optical attenuators 8 and then enter the frequency mixers 1.

For each of the variable optical attenuators 8, the lowest attenuation value is 0 dB, that is, no attenuation, and the highest attenuation value is not limited.

On the optical chip, the variable optical attenuators 8 may be formed in many ways, and are conventional devices. A more common mode is that a PIN junction operating under the forward bias is overlapped with the waveguides in an I area, and a P area and an N area are located at both sides of the waveguides. When a basis voltage is 0 V, the attenuation value is 0 dB; and when the bias voltage increases gradually, the attenuation value gradually increases, and may be up to 10 dB or higher.

When the signal light is too strong, the detectors or back-end circuits may be saturated to be beyond the capabilities of signal amplification, collection and processing circuits of the back-end circuits. In this case, the variable optical attenuators 8 may be used to weaken the signal light intensity. Therefore, the variable optical attenuators 8 can expand a dynamic range of the entire system.

To illustrate interchangeability between the hardware and the software, various illustrative parts, blocks, modules, circuits and steps have been described above generally in terms of functions thereof. Whether the functions are implemented as hardware or software depends on specific applications and design constraints applied to the entire system. Skilled technicians may implement the described functions in varying ways for each particular application, but such implementation decisions should not be interpreted as a departure from the protection scope of the present disclosure.

The invention claimed is:

1. A dual-polarized Lidar receiving end based on an optical chip, comprising: a module for receiving reflected light, configured to receive various paths of signal light returned and split each path of signal light received into two paths of light according to a polarization state, wherein the two paths of light obtained from the each path of signal light are TE-polarized;

a module for receiving local oscillator light, configured to introduce local oscillator light into the receiving end and split the same into a plurality of beams;

a plurality of frequency mixers, configured to mix the TE-polarized local oscillator light output by the module for receiving local oscillator light and all light beams obtained from the module for receiving reflected light, and output two paths of frequency-mixing light beams; and a plurality of detectors, configured to receive frequency-mixing light beams output by the frequency mixers and convert the frequency-mixing light beams into current signals, wherein the module for receiving reflected light is composed of a plurality of signal light receiving channels, and each of the signal light receiving channels receives one path of signal light; and each of the signal light receiving channels comprises a first coupler and a polarized rotating beam splitter connected to the first coupler, wherein the first coupler couples the signal light returned to an optical waveguide, and the polarized rotating beam splitter splits and rotates one path of signal light with two orthogonal polarization states and finally outputs two paths of TE-polarized light.

2. The dual-polarized Lidar receiving end based on an optical chip according to claim 1, further comprising a plurality of variable optical attenuators, wherein all light beams obtained from the module for receiving reflected light enter the variable optical attenuators and then enter the frequency mixers.

3. The dual-polarized Lidar receiving end based on an optical chip according to claim 2, wherein the module for receiving local oscillator light comprises a second coupler and a local oscillator light processor; the linearly polarized light enters a waveguide through the second coupler and is TE-polarized in the waveguide, and then is introduced into the local oscillator light processor through the waveguide; and the light output by the local oscillator light processor is introduced into the frequency mixers through the waveguide.

4. The dual-polarized Lidar receiving end based on an optical chip according to claim 3, wherein the local oscillator light processor is a waveguide.

5. The dual-polarized Lidar receiving end based on an optical chip according to claim 3, wherein the local oscillator light processor is a 1×N beam splitter, and the 1×N beam splitter is formed by the cascading of 1×2 beam splitters.

6. The dual-polarized Lidar receiving end based on an optical chip according to claim 3, wherein the local oscillator light processor is a 1×N router, and the 1×N router is formed by the cascading of 1×2 routers and/or 2×2 routers; each of the 1×2 routers is composed of 1×2 beam splitters, 2×2 beam splitters and a phase shifter; and each of the 2×2 routers is composed of 2×2 beam splitters and a phase shifter.

7. A dual-polarized Lidar receiving end based on an optical chip, comprising: a module for receiving reflected light, configured to receive various paths of signal light returned and split each path of signal light received into two paths of light according to a polarization state, wherein the two paths of light obtained from the each path of signal light are TE-polarized;

a module for receiving local oscillator light, configured to introduce local oscillator light into the receiving end and split the same into a plurality of beams;

a plurality of frequency mixers, configured to mix the TE-polarized local oscillator light output by the module for receiving local oscillator light and all light beams obtained from the module for receiving reflected light, and output two paths of frequency-mixing light beams; and a plurality of detectors, configured to receive frequency-mixing light beams output by the frequency mixers and convert the frequency-mixing light beams into current signals, wherein the module for receiving reflected light is composed of a plurality of dual-polarized coupled beam splitters which are arranged in an array, and each of the dual-polarized coupled beam splitters receives one path of signal light; and each of the dual-polarized coupled beam splitters splits and rotates the two paths of signal light which are orthogonal in polarization directions, and finally outputs two paths of TE-polarized light.

8. The dual-polarized Lidar receiving end based on an optical chip according to claim 7, further comprising a plurality of variable optical attenuators, wherein all light beams obtained from the module for receiving reflected light enter the variable optical attenuators and then enter the frequency mixers.

9. The dual-polarized Lidar receiving end based on an optical chip according to claim 8, wherein the module for receiving local oscillator light comprises a second coupler and a local oscillator light processor; the linearly polarized light enters a waveguide through the second coupler and is TE-polarized in the waveguide, and then is introduced into the local oscillator light processor through the waveguide; and the light output by the local oscillator light processor is introduced into the frequency mixers through the waveguide.

10. The dual-polarized Lidar receiving end based on an optical chip according to claim 9, wherein the local oscillator light processor is a waveguide.

11. The dual-polarized Lidar receiving end based on an optical chip according to claim 9, wherein the local oscillator light processor is a 1×N beam splitter, and the 1×N beam splitter is formed by the cascading of 1×2 beam splitters.

12. The dual-polarized Lidar receiving end based on an optical chip according to claim 9, wherein the local oscillator light processor is a 1×N router, and the 1×N router is formed by the cascading of 1×2 routers and/or 2×2 routers; each of the 1×2 routers is composed of 1×2 beam splitters, 2×2 beam splitters and a phase shifter; and each of the 2×2 routers is composed of 2×2 beam splitters and a phase shifter.

* * * * *